March 31, 1931. S. W. BRANER 1,798,246
GASKET
Filed Sept. 19, 1930
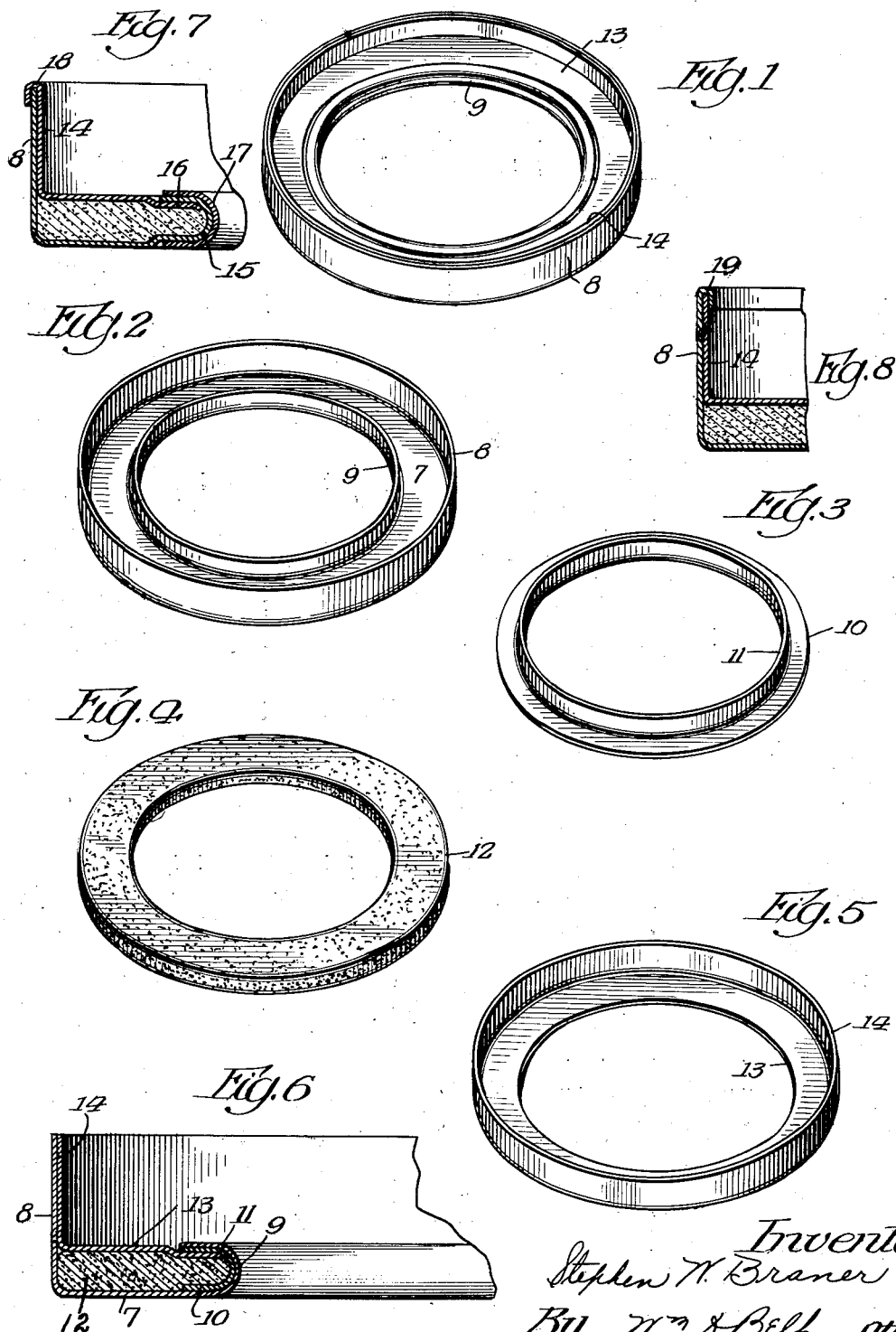

Patented Mar. 31, 1931

1,798,246

UNITED STATES PATENT OFFICE

STEPHEN W. BRANER, OF CHICAGO, ILLINOIS, ASSIGNOR TO VICTOR MANUFACTURING & GASKET CO., OF CHICAGO, ILLINOIS, A CORPORATION OF ILLINOIS

GASKET

Application filed September 19, 1930. Serial No. 483,068.

This invention relates to gaskets and while it is particularly designed for use as a manifold gasket to seal the joint between the intake or exhaust manifold and the cylinder block of an internal combustion engine, it can be used to seal a joint between any other parts for which it is or may be adapted.

The object of the invention is to provide a gasket of strong but simple construction which can be easily made at comparatively low cost, which comprises a guide member of substantial construction adapted to be engaged with one of the parts, say the manifold, to facilitate assembly of the parts, and which is reenforced and protected at the opening in the gasket to resist the conditions of use to which it is subjected.

I have illustrated the gasket in one preferred form in the accompanying drawings and referring thereto.

Fig. 1 is a perspective view of the complete gasket.

Fig. 2 is a perspective view of the lower member.

Fig. 3 is a perspective view of the reenforce member.

Fig. 4 is a perspective view of the heat resisting filler.

Fig. 5 is a perspective view of the upper member.

Fig. 6 is a detail enlarged sectional view of the gasket.

Figs. 7 and 8 show other forms of the invention.

Referring to the drawings the lower member, Fig. 2, comprises a flat annular bottom 7 having an upstanding outer flange 8 and an upstanding inner flange 9. The reenforce, Fig. 3, comprises an annular ring 10 having an upstanding inner flange 11. The outer and inner flanges make the lower member in the form of an annular channel and the reenforce member is located in the channel snugly engaging the inner flange 9, the flange 11 on the reenforce fitting about the flange 9 on the lower member. After the reenforce has been assembled with the lower member the heat resisting filler 12, Fig. 4, is placed in the channel of the lower member with its inner portion resting upon the ring 10 and its edge abutting the flange 11 of the reenforce member. The upper member, Fig. 5, comprises an annular ring 13 with an upstanding peripheral flange 14. This upper member is applied to the assembly of the bottom member, the reenforce member and the filler member; the annular ring 13 fits upon the heat resisting member 12 and within the flanges 11 and 9 of the reenforce and bottom members, with the flange 14 snugly fitting within the flange 8 of the bottom member. Then the flanges 9 and 11 are bent over upon the marginal edge of the ring 13 of the upper member with the flange 9 snugly engaging the flange 11 and the flange 11 snugly engaging the marginal edge of the ring 13. The flanges may be beaded by a spinning operation or in any other suitable manner and the wall of the opening in the gasket is thus made of a strong and substantial construction which is designed to withstand the conditions of use to which these gaskets are subjected. The lower member and the upper member are preferably made of copper, and the reenforce member is preferably made of steel, and the filler is preferably made of asbestos or asbestos composition, but these materials may be changed to satisfy different conditions or for other reasons. The flanges 8 and 14 are of appreciable height, they fit snugly one upon the other, and they form a substantial guide which may be used in mounting the gasket upon one of the parts, as the manifold, about the port therein so that the gasket will remain in place while the joint is being closed. This is an important feature because there are usually several ports for each of which a gasket must be provided, and these gaskets must remain rigidly in place while the parts are being assembled to close the joint. The flanges 8 and 14 not only form a guide and centering means, as described, but they also prevent the gasket from moving or "creeping" which may be induced by the expansion and contraction of parts under heat conditions. Instead of arranging the reenforce within the inner flange portion of the lower member, as shown in Fig. 6, I may lap the inner flange portion 15 of the lower member over the inner marginal edge portion 16 of the upper member and arrange the reenforce 17 over the flange inner portion 15 and snugly enclosing the same as shown in Fig. 7; and I may also provide a bead 18 on the flange 14 overlapping and enclosing the upper edge of the flange 8 as also shown in Fig. 7 or I may provide this bead on the flange 8 to enclose the upper edge of flange 14 as shown at 19 in Fig. 8. The invention is of simple construction, it comprises but few parts which are easy to assemble, and yet it provides a strong and substantial gasket which will not easily be damaged in shipping or in handling, which can be readily mounted about the port and which will effectively seal the joint and withstand the conditions to which manifold gaskets are subjected in modern internal combustion engines, especially of high compression type. And while the invention is more particularly designed for manifold use it may be otherwise used for sealing any joint for which it is or may be adapted. I have shown the invention in a simple form which is satisfactory for manifold use but I reserve the right to make any changes in the form, construction or arrangement of parts which may be necessary or desirable for adapting the invention for manifolds of particular construction and for other purposes, within the scope of the following claim.

I claim:

In a gasket comprising annular lower and upper members, an annular heat-resisting filler interposed between said upper and lower members, and an annular reinforce member incorporated with the marginal edges of said members, guide means for facilitating assembling of said gasket in position of use comprising interengaged annular upstanding flanges of substantial width extending from the outer peripheries of said members.

STEPHEN W. BRANER.